(12) United States Patent
DeLuca et al.

(10) Patent No.: US 9,779,756 B2
(45) Date of Patent: Oct. 3, 2017

(54) METHOD AND SYSTEM FOR INDICATING A SPOKEN WORD HAS LIKELY BEEN MISUNDERSTOOD BY A LISTENER

(71) Applicant: International Business Machines Corporation, Armonk, NY (US)

(72) Inventors: Lisa Seacat DeLuca, Baltimore, MD (US); James R. Kozloski, New Fairfield, CT (US); Clifford A. Pickover, Westchester, NY (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/967,263

(22) Filed: Dec. 11, 2015

(65) Prior Publication Data

US 2017/0169839 A1 Jun. 15, 2017

(51) Int. Cl.
*G10L 21/06* (2013.01)
*G10L 15/18* (2013.01)
*G06F 17/27* (2006.01)
*G06K 9/22* (2006.01)
(Continued)

(52) U.S. Cl.
CPC ............ *G10L 21/06* (2013.01); *G06F 17/241* (2013.01); *G06F 17/277* (2013.01); *G06K 9/222* (2013.01); *G10L 15/1822* (2013.01); *G06K 2209/01* (2013.01); *G10L 2015/088* (2013.01)

(58) Field of Classification Search
CPC ........... G10L 15/1822; G10L 2015/088; G06F 17/277; G06F 17/241; G06K 9/222; G06K 2209/01
See application file for complete search history.

(56) References Cited

U.S. PATENT DOCUMENTS 8,602,793 B1 12/2013 Sniedzins
8,630,633 B1 1/2014 Tedesco et al.
(Continued)

FOREIGN PATENT DOCUMENTS

WO WO2014091479 A1 6/2014

OTHER PUBLICATIONS

Hermann Schweizer "Smart glasses: technology and applications", Ubiquitous computing seminar FS2014.
(Continued)

*Primary Examiner* — Qian Yang
(74) *Attorney, Agent, or Firm* — Ido Tuchman; Louis J. Percello

(57) ABSTRACT

A system for indicating a speaker is likely to be misunderstood by at least one listener from a group of listeners. The system includes a computer interface configured to receive lexicon information from the group of listeners. The lexicon information includes words encountered by each of the listeners from the group of listeners and a word count associated with each of the words. A computer with at least one central processing unit is configured to determine when the word count corresponding to a spoken word from the speaker is below a threshold count. A transducer coupled to the computer is configured to signal the speaker that the spoken word has likely been misunderstood by the listener when the word count corresponding to the spoken word is below the threshold count.

14 Claims, 2 Drawing Sheets

(51) Int. Cl.
*G06F 17/24* (2006.01)
*G10L 15/08* (2006.01)

(56) References Cited

U.S. PATENT DOCUMENTS

| | | | |
|---|---|---|---|
| 2011/0066435 A1* | 3/2011 | Tomono | H04N 7/15 |
| | | | 704/251 |
| 2013/0090921 A1* | 4/2013 | Liu | G10L 15/22 |
| | | | 704/10 |
| 2013/0137076 A1 | 5/2013 | Perez et al. | 434/308 |
| 2014/0278409 A1* | 9/2014 | Hakkani-Tur | G06F 21/00 |
| | | | 704/235 |
| 2014/0295384 A1 | 10/2014 | Nielson et al. | |
| 2014/0337023 A1* | 11/2014 | McCulloch | G06F 1/163 |
| | | | 704/235 |
| 2014/0337131 A1 | 11/2014 | Edara | |
| 2014/0337740 A1 | 11/2014 | Kwon et al. | |
| 2016/0209648 A1* | 7/2016 | Haddick | G02B 27/0093 |

OTHER PUBLICATIONS

Charlie Sorrel, Word Lens: Augmented Reality App Translates Street Signs Instantly, http://www.wired.com/2010/12/word-lens-augmented-reality-app-translates-street-signs-instantly/, pp. 1-8 (Dec. 10, 2010).
Ci, 5 Awesome OCR Apps for iPhone, http://www.iphoneness.com/iphone-apps/ocr-apps-for-iphone/, pp. 1-9 (Feb. 3, 2015).
Chikahito Nakajima, et al., Object Recognition and Detection by a Combination of Support Vector Machine and Rotation Invariant Phase Only Correlation, IEEE, http://www.academia.edu/1107504/Object_recognition_and_detection_by_a_combination_of_support_vector_machine_and_rotation_invariant_phase_only_correlation, pp. 787-790 (2000).

* cited by examiner

METHOD AND SYSTEM FOR INDICATING A SPOKEN WORD HAS LIKELY BEEN MISUNDERSTOOD BY A LISTENER

BACKGROUND

The present invention relates generally to a communication aid, and more particularly to method and system for indicating a spoken word has likely been misunderstood by a listener.

Wearable computers are typically computers a user wears on his or her body or carried by the user's clothing. Wearable computers provide computing resources to the wearer while he or she is moving around. Often times, wearable computers include sensors to receive information from the user and feedback devices to provide information back to the user. Wearable computers can also keep a user wirelessly connected to a computer network. Thus, a wearable computer can communicate data to and from the user as the user interacts with the real world.

One example of a wearable computer is Google Glass. Google Glass includes an optical head-mounted display (OHMD) that can display information to the wearer. Google Glass includes a microphone that can receive natural language voice commands. It also includes a camera that can take photos and record videos. A touchpad located on the side of Google Glass allows users to control the device by swiping a finger. Google Glass also provides wireless network connectivity.

BRIEF SUMMARY

One example aspect of the present invention is a system for indicating a speaker is likely to be misunderstood by at least one listener from a group of listeners. The system includes a computer interface configured to receive lexicon information from the group of listeners. The lexicon information includes words encountered by each of the listeners from the group of listeners and a word count associated with each of the words. A computer with at least one central processing unit is configured to determine when the word count corresponding to a spoken word from the speaker is below a threshold count. A transducer coupled to the computer is configured to signal the speaker that the spoken word has likely been misunderstood by the listener when the word count corresponding to the spoken word is below the threshold count.

Another example aspect of the present invention is a method for indicating a speaker is likely to be misunderstood by at least one listener from a group of listeners. The method includes aggregating lexicon information from the group of listeners. The lexicon information includes words encountered by each of the listeners from the group of listeners and a word count associated with each of the encountered words. A communicating operation communicates the lexicon information to a computer interface. At a detecting operation, a computer coupled to the computer interface detects when the word count corresponding to a spoken word from the speaker is below a threshold count. A signaling operation signals the speaker that the spoken word has likely been misunderstood by the listener when the word count corresponding to the spoken word is below the threshold count.

A further example aspect of the present invention is a computer program product for indicating a speaker is likely to be misunderstood by at least one listener from a group of listeners. The computer program product includes computer readable program code configured to aggregate lexicon information from the group of listeners, communicate the lexicon information to a computer interface, detect when the word count corresponding to a spoken word from the speaker is below a threshold count, and signal the speaker that the spoken word has likely been misunderstood by the listener when the word count corresponding to the spoken word is below the threshold count.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
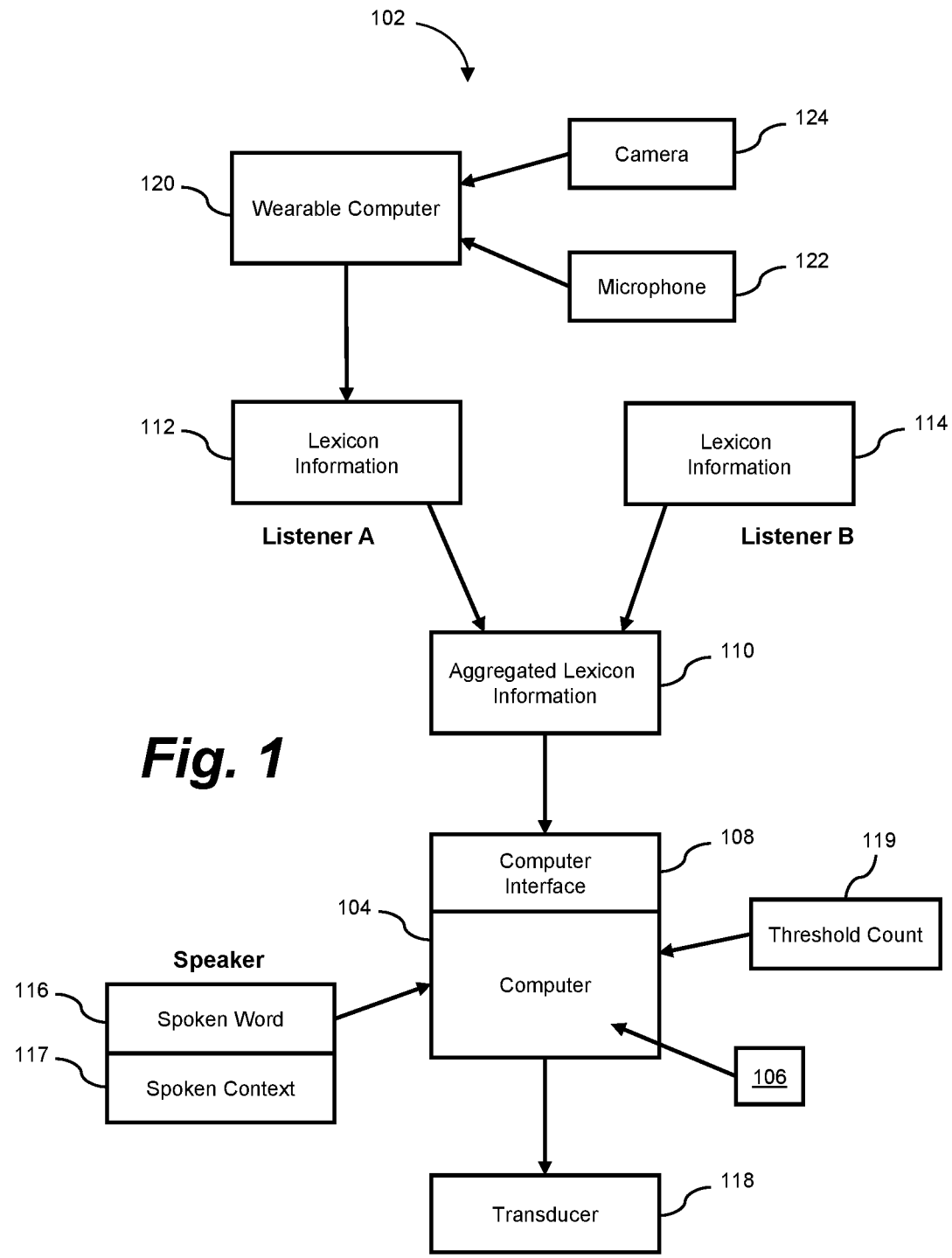
FIG. 1 shows an example system for indicating a speaker is likely to be misunderstood by at least one listener from a group of listeners contemplated by the present invention.

The present invention is described with reference to embodiments of the invention. Throughout the description of the invention reference is made to FIGS. 1 and 2. When referring to the figures, like structures and elements shown throughout are indicated with like reference numerals.

FIG. 1 shows an example system 102 for indicating a speaker is likely to be misunderstood by at least one listener from a group of listeners contemplated by the present invention. For instance, during sales meetings a presenter may use the system 102 to make sure the audience understands the lexicon she is using. Alternately, the system 102 may raise an alert as soon as the speaker's words have a high likelihood of being misunderstood. This may have significant value in cultures where it is considered rude to interrupt a speaker to ask questions or clarification.

The system 102 includes a computer 104 with at least one central processing unit (CPU) 106. The computer 104 is coupled to a computer interface 108. The computer interface 108 is configured to receive aggregated lexicon information 110 from a group of listeners. For example, Listener A may contribute his or her individual lexicon information 112 to the aggregated lexicon information 110 and Listener B may contribute his or her individual lexicon information 114 to the aggregated lexicon information 110.

The individual lexicon information 112, 114 includes words encountered by the individual and a word count associated with each of the encountered words. In one embodiment, the word count indicates the number of times each of the words is encountered in a particular context by the individual. Table 1 shows an example of individual lexicon information 112, 114 transmitted to the aggregated lexicon information 110.

TABLE 1

Example individual lexicon information

| Word | Context | Count |
|---|---|---|
| ... | ... | ... |
| triangulate | 1 | 23 |

TABLE 1-continued

Example individual lexicon information

| Word | Context | Count |
|---|---|---|
| triangulate | 2 | 2 |
| tribal | 1 | 68 |
| ... | ... | ... |

In the example shown in Table 1, the word "triangulate" is more familiar to the individual in one context (Context 1) than in another (Context 2). Specifically, the individual has encountered the word "triangulate" 23 times in Context 1 and only twice in Context 2.

The aggregated lexicon information 110 includes words encountered by each of the listeners from the group of listeners and a word count associated with each of the encountered words. Again, the word count may indicate the number of times each of the encountered words is encountered in a particular context by an individual. Table 2 shows an example of aggregated lexicon information 110 received by the computer interface 108.

TABLE 2

Example aggregated lexicon information

| Word | Context | Listener A Count | Listener B Count |
|---|---|---|---|
| ... | ... | ... | ... |
| triangulate | 1 | 23 | 45 |
| triangulate | 2 | 2 | 0 |
| triatomic | 1 | 0 | 6 |
| tribal | 1 | 68 | 72 |
| ... | ... | ... | ... |

Table 2 illustrates that Listener B has more familiarity than Listener A with the word "triangulate" in Context 1, but is less familiar than Listener A when the word is used in Context 2. In one embodiment, the computer interface 108 may receive the individual lexicon information 112, 114 from the listeners and the computer 104 may combine the individual lexicon information 112, 114 to create the aggregated lexicon information 110.

The computer 104 is configured to receive spoken words 116 from a speaker. The computer 104 may, for example, include a microphone and use speech recognition methods (such as Hidden Markov models, dynamic time warping (DTW)-based speech recognition, deep neural networks and other deep learning models) to determine the words spoken by the speaker. The computer 104 may further determine a spoken context 117 for the spoken word 116 from the speaker.

Next, the computer 104 determines the word count corresponding to the spoken word 116 and spoken context 117 from the speaker for each of the listeners of the group. For example, referring back to Table 2, if the speaker utters the word "triangulate" within Context 2, the computer 104 would determine that Listener A has encountered "triangulate" twice in the context used by the speaker and Listener B has never encountered "triangulate" in such a context.

After determining the word count for the spoken word 116 for each listener, the computer 104 determines if the word count for any of the listeners is below a threshold count 119. Furthermore, the computer 104 activates a transducer 118 when the word count corresponding to the spoken word 116 and the spoken context for any of the listeners is below the threshold count 119. The transducer 118 is coupled to the computer and is configured to signal the speaker that the spoken word 116 has likely been misunderstood by at least one listener from the group when the word count corresponding to the spoken word 116 is below the threshold count 119.

The system may notify the speaker that a word was potentially misunderstood through one of several methods. In one embodiment, the transducer 118 is a vibrating device, such as a vibration motor, that silently alerts the speaker that the spoken word is likely to be misunderstood by at least one listener from a group of listeners. In another embodiment, the transducer is incorporated in a heads up display. For example, the system may notify the speaker's heads up display to highlight which word was most likely not understood by the audience, and may provide an example on the display of the use of the word that is more familiar to the audience, but which is not the usage the speaker was employing. In this way the speaker may pause, note the new information on the display, and adjust his or her delivery to the notification by saying something like, "Now you may be familiar with term X in context Y, however I was using it in context Z, such that the meaning is changed to X*."

The individual lexicon information 112, 114 may be generated by wearable computers 120 carried by the listeners. A wearable computer 120 is configured to automatically track words encountered by individual listeners from the group of listeners. In one embodiment, a microphone 122 is coupled to the wearable computer 120 and converts an audio stream into an electrical signal. The wearable computer 120 can be configured to perform speech recognition on the encountered words and annotate the individual lexicon information 112 with the encountered words. The wearable computer 120 may also or alternatively include a camera 124 configured to take camera images. The wearable computer 120 can be configured to perform optical character recognition (OCR) on the encountered words in the camera images and annotate the individual lexicon information 112 with the encountered words in the camera images.

Listeners may opt in to sharing their lexicon with the speaker or presenter. It is contemplated that the aggregated lexicon information 110 may be anonymized such that no individual listener from the group of listeners is identifiable by the lexicon information. In addition, aggregation of lexicons from a large number of individuals may provide sufficient anonymity for normal use cases.

Figure 2:
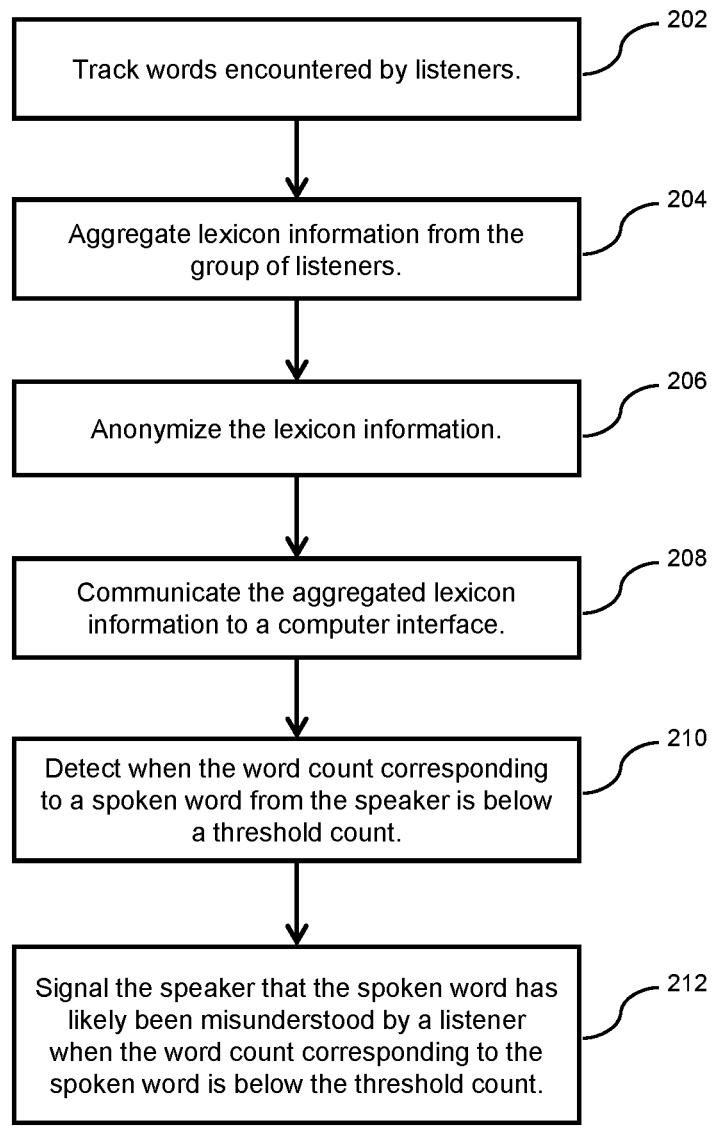
FIG. 2 shows an example method for indicating a speaker is likely to be misunderstood by at least one listener from a group of listeners contemplated by the present invention.

FIG. 2 shows an example method for indicating a speaker is likely to be misunderstood by at least one listener from a group of listeners contemplated by the present invention. The speech analysis operations described below may be performed locally on a speaker's wearable computer, between a synthesis of devices, or on remote servers if bandwidth and latency allow. The steps for ingesting the speech described below may be a user wearable heads up display, a mobile phone or another wearable device.

A tracking operation 202 automatically tracks words encountered by one or more listeners from the group of listeners. Word tracking can be accomplished by a wearable computer, such as a user's wearable heads up display or a mobile phone. It is contemplated that the wearable computer may track words encountered through sight and/or sound. For example, tracking operation 202 may include receiving camera images from a camera carried by one of the listeners from the group of listeners, performing optical character recognition on the encountered words in the camera images, and annotating lexicon information with the encountered words in the camera images. Additionally, tracking operation 202 may include converting an audio stream into an electrical signal by a microphone carried by one or more of the listeners from the group of listeners, performing speech recognition on the encountered words in the audio stream, and annotating the lexicon information with the encountered words. After tracking operation 202, the method continues to aggregating operation 204.

At aggregating operation 204, lexicon information from the group of listeners is aggregated. As discussed above, the lexicon information includes encountered words encountered by each of the listeners from the group of listeners and a word count associated with each of the encountered words. In one embodiment, the word count indicates the number of times each of the encountered words is encountered in a particular context by each of the listeners from the group of listeners. In one embodiment, encountered words are placed in a look-up table with a count indicating the number of times the word has been seen or heard. If a user has seen or heard a word a large number of times the system may determine that the user is familiar with that word, with confidence level C1. After aggregating operation 204, the method continues to anonymizing operation 206.

At anonymizing operation 206, the lexicon information is anonymized such that no individual listeners from the group of listeners is identifiable by the lexicon information. After anonymizing operation 206, the method continues to communicating operation 208.

At communicating operation 208, the aggregated lexicon information from the group of listeners is communicated to a computer interface. After communicating operation 208, the method continues to detecting operation 210.

At detecting operation 210, a computer coupled to the computer interface detects when the word count corresponding to a spoken word from the speaker is below a threshold count. Thus, as the speaker talks to the audience, using the information contained in the shared lexicon, if a listener or set of members have never seen or heard a word, and the word is judged to be difficult with confidence level C2, the proposed system may notify the speaker that the spoken word might need further clarification. After detecting operation 210, the method continues to signaling operation 212.

At signaling operation 212, the speaker is signaled that the spoken word has likely been misunderstood by one or more listeners from the group of listeners when the word count corresponding to the spoken word is below the threshold count. In one embodiment, the signaling operation 212 includes activating a transducer when the word count corresponding to the spoken word and the spoken context for any of the listeners is below the threshold count.

Accordingly, embodiments of the present invention can help indicate when a spoken word has likely been misunderstood by at least one listener. Such a configuration can provide real-time support for speakers during conversational speech. They system can help predict when a listener does not know the correct definition of a word, even when the user thinks that he or she does know the definition. Embodiments can provide faster expertise delivery to sales and marketing employees who need quick acronym and technical term definitions.

In one embodiment, a wearable head mounted display automatically tracks the words the user has seen by using OCR and speech-to-text technologies. These words are put into a look-up table with a count indicating the number of times the word has been seen or heard. If a user has seen or heard a word a large number of times the system may determine that the user is familiar with that word, with confidence level C1.

Additionally, a word may be represented based on its relationships to other words the user has seen or heard in the context of the word. Such graphical models of text (e.g., probabilistic models for which a graph denotes words as nodes and sequences of words as conditional dependencies or edges) provide a means to accumulate statistics not only on frequency of occurrence of the word, but also of the graphical (semantic) motifs in which the word has appeared. The word may be represented in both the context in which it was encountered in text or spoken by another, and separately in the way in which the user has used the word in written text or in speaking. To accomplish the latter distinction, the system can recognize when the text or speech is generated by the user and not by another individual. If the user has never seen or heard a word, and the word is judged to be difficult with confidence level C2, the proposed system may automatically provide a signal to the speaker that the word or phrase has likely been misunderstood.

The estimation of C1 and C2 may be performed in many ways. For example, C1 and C2 may be roughly estimated based on a listener's job title, reading habits, a user profile, social network analysis, educational background, demographic, history of Web pages browsed, native language, language translation needs, etc. Users may "opt in" for providing any of this background information so as to avoid privacy concerns. Also, once information is provided and confidence levels obtained, the information can be discarded.

In other embodiments, to increase accuracy if the user is reading text on either a computer or an e-reader, the text of the page may be sent to the wearable head mounted display for analysis. This may be more accurate than OCR technologies. In some embodiments the system may not provide alerts to a speaker until a certain amount of material has been read, this may prevent providing alerts to the presenter based on an incomplete understanding of the listener's vocabulary. This approach may also have particular utility when many different people are viewing a presentation, which is given with set of presentation slides with one or more difficult words.

Additionally, the system may provide reports to a teacher (speaker) on the words or contexts which the system has deemed a student (listener) has trouble. Such reports may be transformed automatically by the system into follow up quizzes to ensure the student has remembered the meaning of the new words.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for indicating a speaker is likely to be misunderstood by at least one listener from a group of listeners, the system comprising:
    a computer interface configured to receive lexicon information from the group of listeners, the lexicon information including encountered words encountered by each of the listeners from the group of listeners and a word count associated with each context of the encountered words wherein there is a different word count for different contexts associated with each of the encountered words;

a computer including at least one central processing unit, the computer configured to determine when the word count corresponding to a spoken word from the speaker is below a threshold count;
a transducer coupled to the computer, the transducer configured to signal the speaker that the spoken word has likely been misunderstood by the listener from the group of listeners when the word count corresponding to the spoken word is below the threshold count;
a wearable computer configured to automatically track the encountered words encountered by one of the listeners from the group of listeners;
a camera coupled to the wearable computer, the camera configured to take camera images; and
wherein the wearable computer is configured to:
perform optical character recognition on the encountered words in the camera images; and
annotate the lexicon information with the encountered words in the camera images.

2. The system of claim 1, further comprising:
wherein the word count indicates a number of times each of the encountered words is encountered by each of the listeners from the group of listeners; and
wherein the computer is configured to:
determine the word count corresponding to the spoken word from the speaker for each of the listeners from the group of listeners; and
activate the transducer when the word count corresponding to the spoken word for any of the listeners is below the threshold count.

3. The system of claim 2, further comprising:
wherein the word count indicates the number of times each of the encountered words is encountered in a particular context by each of the listeners from the group of listeners; and
wherein the computer is configured to:
determine a spoken context for the spoken word from the speaker;
determine the word count corresponding to the spoken word and the spoken context for each of the listeners from the group of listeners; and
activate the transducer when the word count corresponding to the spoken word and the spoken context for any of the listeners is below the threshold count.

4. The system of claim 1, further comprising:
a microphone coupled to the wearable computer to convert an audio stream into an electrical signal; and
wherein the wearable computer is configured to:
perform speech recognition on the encountered words in the audio stream; and
annotate the lexicon information with the encountered words.

5. A method for indicating a speaker is likely to be misunderstood by at least one listener from a group of listeners, the method comprising:
aggregating lexicon information from the group of listeners, the lexicon information including encountered words encountered by each of the listeners from the group of listeners and a word count associated with each context of the encountered words wherein there is a different word count for different contexts associated with each of the encountered words;
communicating the lexicon information to a computer interface;
detecting by a computer coupled to the computer interface when the word count corresponding to a spoken word from the speaker is below a threshold count;
signaling the speaker that the spoken word has likely been misunderstood by the listener from the group of listeners when the word count corresponding to the spoken word is below the threshold count;
automatically tracking the encountered words encountered by one of the listeners from the group of listeners;
receiving camera images from a camera carried by one of the listeners from the group of listeners; performing optical character recognition on the encountered words in the camera images; and
annotating the lexicon information with the encountered words in the camera images.

6. The method of claim 5, further comprising:
determining the word count corresponding to the spoken word from the speaker for each of the listeners from the group of listeners, the word count indicating a number of times each of the encountered words is encountered by each of the listeners from the group of listeners; and
activating a transducer when the word count corresponding to the spoken word for any of the listeners is below the threshold count.

7. The method of claim 5, further comprising:
determining a spoken context for the spoken word from the speaker;
determining the word count corresponding to the spoken word and the spoken context for each of the listeners from the group of listeners, the word count indicating a number of times each of the encountered words is encountered in a particular context by each of the listeners from the group of listeners; and
activating a transducer when the word count corresponding to the spoken word and the spoken context for any of the listeners is below the threshold count.

8. The method of claim 5, further comprising:
converting an audio stream into an electrical signal by a microphone carried by one of the listeners from the group of listeners; and
performing speech recognition on the encountered words in the audio stream; and
annotating the lexicon information with the encountered words.

9. The method of claim 5, further comprising anonymizing the lexicon information such that no individual listeners from the group of listeners is identifiable by the lexicon information prior to communicating the lexicon information from the group of listeners to the computer interface.

10. A computer program product for indicating a speaker is likely to be misunderstood by at least one listener from a group of listeners, the computer program product comprising:
a non-transitory computer readable storage medium having computer readable program code embodied therewith, the computer readable program code configured to:
aggregate lexicon information from the group of listeners, the lexicon information including encountered words encountered by each of the listeners from the group of listeners and a word count associated with each context of the encountered words wherein there is a different word count for different contexts associated with each of the encountered words;
communicate the lexicon information to a computer interface;
detect when the word count corresponding to a spoken word from the speaker is below a threshold count;
signal the speaker that the spoken word has likely been misunderstood by the listener from the group of listeners when the word count corresponding to the spoken word is below the threshold count;
automatically track the encountered words encountered by one of the listeners from the group of listeners;
receive camera images from a camera carried by one of the listeners from the group of listeners;
perform optical character recognition on the encountered words in the camera images; and
annotate the lexicon information with the encountered words in the camera images.

11. The computer program product of claim 10, further comprising computer readable program code configured to:
determine the word count corresponding to the spoken word from the speaker for each of the listeners from the group of listeners, the word count indicating a number of times each of the encountered words is encountered by each of the listeners from the group of listeners; and
activate a transducer when the word count corresponding to the spoken word for any of the listeners is below the threshold count.

12. The computer program product of claim 10, further comprising computer readable program code configured to:
determine a spoken context for the spoken word from the speaker;
determine the word count corresponding to the spoken word and the spoken context for each of the listeners from the group of listeners, the word count indicating a number of times each of the encountered words is encountered in a particular context by each of the listeners from the group of listeners; and
activate a transducer when the word count corresponding to the spoken word and the spoken context for any of the listeners is below the threshold count.

13. The computer program product of claim 10, further comprising computer readable program code configured to:
convert an audio stream into an electrical signal by a microphone carried by one of the listeners from the group of listeners; and
perform speech recognition on the encountered words in the audio stream; and
annotate the lexicon information with the encountered words.

14. The computer program product of claim 10, further comprising computer readable program code configured to anonymize the lexicon information such that no individual listeners from the group of listeners is identifiable by the lexicon information prior to communicating the lexicon information from the group of listeners to the computer interface.

* * * * *